United States Patent
Cantemir

(10) Patent No.: US 10,308,365 B2
(45) Date of Patent: Jun. 4, 2019

(54) FULLY INTEGRATED HYBRID ELECTRIC JET ENGINE

(71) Applicant: Codrin-Gruie Cantemir, Columbus, OH (US)

(72) Inventor: Codrin-Gruie Cantemir, Columbus, OH (US)

(73) Assignee: Codrin-Gruie (CG) Cantemir, Columbus, OH (US)

( * ) Notice: Subject to any disclaimer, the term of this patent is extended or adjusted under 35 U.S.C. 154(b) by 0 days.

(21) Appl. No.: 15/291,271

(22) Filed: Oct. 12, 2016

(65) Prior Publication Data

US 2018/0127103 A1    May 10, 2018

Related U.S. Application Data

(60) Provisional application No. 62/404,224, filed on Oct. 5, 2016, provisional application No. 62/240,122, filed on Oct. 12, 2015.

(51) Int. Cl.

| | |
|---|---|
| *F02C 6/00* | (2006.01) |
| *F02K 3/06* | (2006.01) |
| *F02K 3/00* | (2006.01) |
| *F02C 7/32* | (2006.01) |
| *F02K 5/00* | (2006.01) |
| *F04F 5/20* | (2006.01) |
| *B64D 27/16* | (2006.01) |

(Continued)

(52) U.S. Cl.
CPC .............. *B64D 27/16* (2013.01); *B64D 27/24* (2013.01); *F01D 15/10* (2013.01); *F02C 6/00* (2013.01); *F02C 7/32* (2013.01); *F02K 3/00* (2013.01); *F02K 3/06* (2013.01); *F02K 5/00* (2013.01); *F04D 19/02* (2013.01); *F04D 27/009* (2013.01); *F04D 29/053* (2013.01); *F04F 5/20* (2013.01); *H02K 1/146* (2013.01); *H02K 3/12* (2013.01); *H02K 3/18* (2013.01); *H02K 3/28* (2013.01); *H02K 3/50* (2013.01); *H02K 3/524* (2013.01); *H02K 7/14* (2013.01); *H02K 9/06* (2013.01); *H02K 11/33* (2016.01); *H02K 21/225* (2013.01); *B64D 2027/026* (2013.01); *F05D 2220/76* (2013.01); *Y02T 50/672* (2013.01)

(58) Field of Classification Search
CPC .. B64D 27/16; B64D 27/24; B64D 2027/026; H02K 9/06; H02K 3/28; H02K 11/33; F04D 29/053; F04D 27/009; F04D 19/02; F04F 5/20

See application file for complete search history.

(56) References Cited

U.S. PATENT DOCUMENTS

| | | | |
|---|---|---|---|
| 9,018,806 B2* | 4/2015 | Beier | F01D 15/10 310/43 |
| 9,032,702 B2* | 5/2015 | Beier | F01D 15/10 60/39.08 |

(Continued)

*Primary Examiner* — Michael C Zarroli

(57) ABSTRACT

Disclosed is a high-power electric motor and its fabrication technology. The motor and its distributed power electronics are all being fully integrated in a conventional turbofan engine. The rotor drives directly (with no gears) the LP shaft of the jet engine while requiring minimal modification to a basic jet engine and without distortion to the nacelle geometry. In principle such a configuration should be suitable for a power level of 10 to 50 MW, which makes it fully capable of providing a standard flight envelope by only using electric energy.

18 Claims, 5 Drawing Sheets

(51) Int. Cl.
  *F04D 19/02*   (2006.01)
  *F04D 27/00*   (2006.01)
  *F04D 29/053*  (2006.01)
  *B64D 27/24*   (2006.01)
  *H02K 11/33*   (2016.01)
  *H02K 3/28*    (2006.01)
  *H02K 9/06*    (2006.01)
  *H02K 21/22*   (2006.01)
  *H02K 1/14*    (2006.01)
  *H02K 3/12*    (2006.01)
  *H02K 3/18*    (2006.01)
  *H02K 3/50*    (2006.01)
  *H02K 3/52*    (2006.01)
  *H02K 7/14*    (2006.01)
  *F01D 15/10*   (2006.01)
  *B64D 27/02*   (2006.01)

(56) References Cited

U.S. PATENT DOCUMENTS

| | | | | |
|---|---|---|---|---|
| 9,143,023 B1* | 9/2015 | Uskert | ............... | H02K 16/00 |
| 9,175,695 B2* | 11/2015 | Bulin | ............... | B64D 29/00 |
| 2006/0228957 A1* | 10/2006 | Matic | ............... | B63H 11/08 |
| | | | | 440/38 |
| 2010/0251692 A1* | 10/2010 | Kinde, Sr. | ............... | F02K 5/026 |
| | | | | 60/226.1 |
| 2014/0191624 A1* | 7/2014 | Jahshan | ............... | H02K 35/02 |
| | | | | 310/68 B |
| 2017/0226959 A1* | 8/2017 | Julien | ............... | F02K 1/386 |

* cited by examiner

FULLY INTEGRATED HYBRID ELECTRIC JET ENGINE

CROSS REFERENCE TO RELATED APPLICATIONS

This application claims priority to U.S. provisional application No. 62/240,122 filed on 12 Oct. 2015 and to U.S. provisional application No. 62/404,224 filed on 5 Oct. 2016.

STATEMENT OF GOVERNMENT INTEREST

The Government of the United States of America may have rights in the present invention as a result of Grant No. NNX14AL87A awarded by NASA, with the exception of certain technical solutions and technologies implemented in present invention which have been developed independently and have been presented to NASA prior the award.

BACKGROUND OF THE INVENTION

1) Field of Invention

The present invention is directed to a hybrid electric gas turbine engine, in particular a high by-pass turbofan engine for aircraft propulsion.

2) Prior Art

Gas turbine engines assisted by electric machines are known in the art. However, existing solutions are mostly conceived as "mild hybrids". Benefits of mild hybridization are typically beneficial to enhance transient dynamics and operational envelope (e.g. increasing compressor surge margins) and mitigate auxiliary functions. Overall, such solutions were not intended for high power applications in which flight can be fully sustained only by electric energy. Therefore, if existing solutions will be sized as a "plug-in hybrids", then performances will be detracted due to extra gearing and/or distortion of the optimal flow geometry and/or lack of available geometry for the integration of a good-sized electric machine.

In order to fully capture all the hybridization benefits, there is a need for a hybrid electric turbofan engine which can provide also an important amount of thrust solely by electric energy. This need is also a consequence of an exponential progress seen in the past time in the area of energy storage devices, most notable in electric batteries and their chemistry.

However, in order to make such turbofan engine economically feasible, a sizable high-power density electric machine should be accommodated without distorting in any way the flow geometry and the thermodynamic part of the engine.

SUMMARY OF THE INVENTION

It is an object of this invention to provide a turbofan engine with a high degree of electric hybridization in order to fully sustain flight at least in cruise conditions. For the sake of example, a turbofan engine in the 100-150 kN thrust class will require an electric machine capable of delivering (and absorbing) 10 to 15 MW continuously. This is roughly the power requirement for the fan in cruise conditions.

It is a further object of this invention to accommodate a high-power density motor in the optimum nacelle envelope without distorting the core flow.

More particularly, this invention seeks to provide a direct drive solution, avoiding gearing and clutching, while enhancing the overall operational safety.

All the foregoing objects are attained by the hybrid electric turbofan engine presented in this invention The architecture of the present invention consists of an electric machine designed on purpose to fit inside of an existing conventional twin spool turbofan jet engine (like CFM 56) while being located between the LP compressor and the HP compressor and connected resilient to the LP shaft.

For the purpose of this invention and in accordance with the technical vocabulary, LP and HP are acronyms for Low Pressure and High Pressure respectively and are used ubiquitously. Furthermore, a conventional twin spool turbofan will have the LP compressor, the LP turbine and the fan resilient to the LP shaft as well as the HP turbine and the HP compressor resilient to the HP shaft. Also in accordance with the technical vocabulary, the assembly of LP and HP compressors, shafts and turbines plus the combustors are known as "the core". It should also be mentioned that for a turbofan engine, typically only a fraction of the fan flow is directed to the core to sustain combustion. Instead, most of the fan flow produces thrust directly while by-passing the core through a circular by-pass duct that embraces the core. For the previous example (a 100 to 150 kN thrust turbofan engine), the operational speed of the LP shaft will fall in the 4000 to 5000 rpm interval.

The location of the electric machine takes also advantage of the mid-box structure which is the most rigid part of a jet engine.

For the purpose of this invention and in accordance with the technical vocabulary, the mid-box is the main structural component of the jet engine and provides mounting for most of the components, while transferring various loads from the engine to the pylon or wing. Typically the mid-box is a short axial weldment construction made from steel alloy, albeit modern engines may use more advanced materials. Occasionally this structure may be identified under different terminologies as "Fan Frame" or "Rear Fan Case".

In order to accommodate the core geometry, the electric machine has a configuration generically known as "ring type". Such configuration does not use most of the internal geometry for electromagnetic purposes. Thus it is possible to design such machines with a very sizable hollow shaft and to connect the LP compressor with the HP compressor thru a passage inside the machine shaft. Particularly, the "ring type" configuration is also advantageous due an increased air gap radius/air gap speed and thus an increase power density. Practically, the air gap speed may be higher than the highest tip speed in the LP compressor, around 250 m/s while the rotor OD will still fits inside the inner geometry of the by-pass duct. In order to decrease the windage losses the air gap is sealed from the exterior and the air inside the machine is removed continuously with a vacuum pump.

In order to further increase the power density, the electric machine is designed with VCSC (Variable Cross-Section Coils) technology ring coils. Per the electric machine vocabulary, a ring coil is formed around the yoke (or the back iron) of a magnetic circuit and is located in the slot formed by two adjacent magnetic teeth. Therefore, each turn of an elementary ring coil is located only in one slot, which is different from a conventional distributed winding that has each elementary turn located in at least 2 slots. The base idea of a variable cross-section coil resides in the fact that the slot (the gap between two adjacent teeth) itself represents a geometric bottleneck, however outside of the slot there is more space available and a higher cross-section conductor may be implemented. Due to the fact that the length of the conductor outside of the slot is in most cases significantly longer than inside the slot, it is possible to obtain significant gains in decreasing the coils resistance. Practically, the VCSC technology permits the usage of aluminum (vs. copper) while decreasing the total weight 2 to 3 times for the same electric resistance.

Another particularity of such implementation is the fact that the power electronic modules are located in the very close vicinity of the coils. It is desirable that each coil will be controlled independently by an individual (monophasic) inverter and thus the power level per module will not exceed 300 kVA—a very reasonable load for many semiconductor technologies.

Furthermore, the power electronic and the coils are sharing the same cooling circuit. The maximum total heat which need to be dissipated may be over 1 MW at RTO. Therefore the heat is dumped in the by-pass duct in order to provide extra thrust. For the reader intuition, dumping 1 MW in the by-pass may create an additional 700 N of thrust at cruise condition, therefore some 200 kW at the airframe. This may be equivalent with a net increase with 1% absolute (e.g. from 0.94 to 0.95) of the system efficiency. In order to dissipate the heat, it is preferable that the fan booster to act also as a heat exchanger. Additionally a surface heat exchanger may be located in the duct, both solutions having the advantage of dissipating heat without introducing pressure losses in the duct flow.

DETAILED DESCRIPTION OF THE PREFERRED EMBODIMENTS

Figure 1:
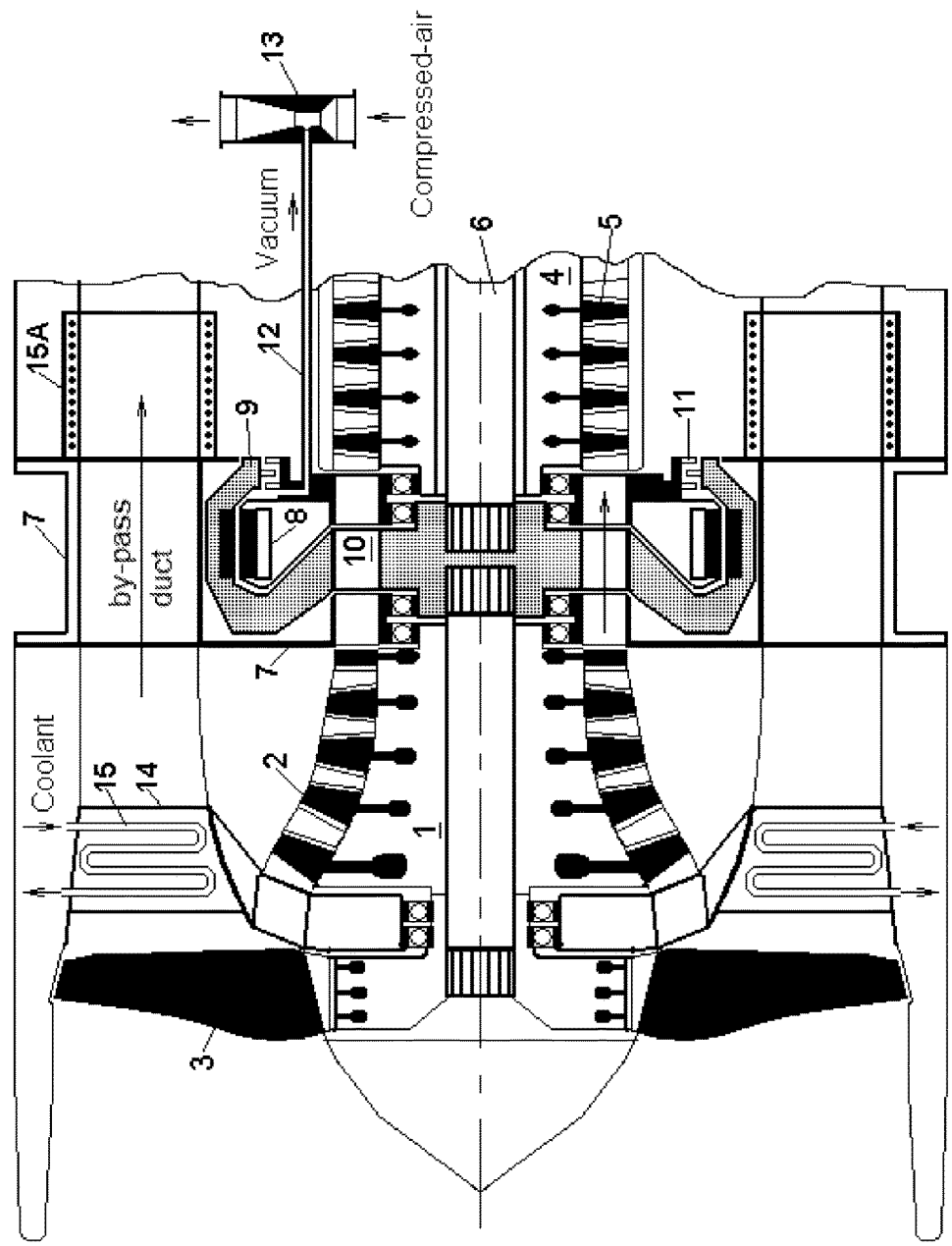
FIG. 1 is a partial cross section of a hybrid electric jet engine in accordance with the present invention.

Referring to the drawings, FIG. 1 represents a generic representation of a hybrid electric turbofan jet engine from which the combustion section and the turbines were removed. The configuration of the turbofan engine is a classic two shafts spinning freely, with the LP shaft 1 supporting the LP compressor 2 and the main fan 3. The HP shaft 4 is supporting the HP compressor 5 and is driven in a conventional manner by a LP turbine (not figured). The LP shaft 1 is driven by a LP turbine (not figured) via a torque shaft 6. In general the speeds between the shafts are significantly different, e.g. by a factor of 2.5 to 3. The turbofan engine assembly is mounted around a mid-box 7 which acts also as the main structural part. A ring type electric motor 8 is also mounted inside the mid-box 7. The rotor 9 of the motor 8 is resiliently coupled to the LP shaft 1 and to the torque shaft 6. The rotor 9 is designed with profiled (curved) spokes 10 in order allow an unrestricted airflow passage from the LP compressor to the HP compressor. Desirable, the rotor 9 is made from composite materials in order to sustain very high mechanical stresses and to not interfere with the electromagnetic circuits. In order to mitigate the windage losses related to very high tangential speeds of the rotor 9, the air-gap volume is sealed with a seal 11. Furthermore, the internal air volume of the motor is connected via a conduit 12 to a vacuum pump 13. The vacuum pump 13 may be of any suitable configuration, with a Venturi type being preferred for its simplicity. Such pump will use a small quantity of compressed air in order to maintain a reasonable level of vacuum inside the motor while the jet engine is functioning. Furthermore, the electric machine and its related power electronics are liquid cooled by a common coolant loop. In order to dissipate the heat, the coolant is flown thru the booster 14. The booster blades are designed for the optimum air-flow efficiency, however cooling channels 15 are added internally in order to provide adequate heat transfer. Additionally or alternatively, a surface cooler 15A may be also located inside the by-pass duct.

Figure 2:
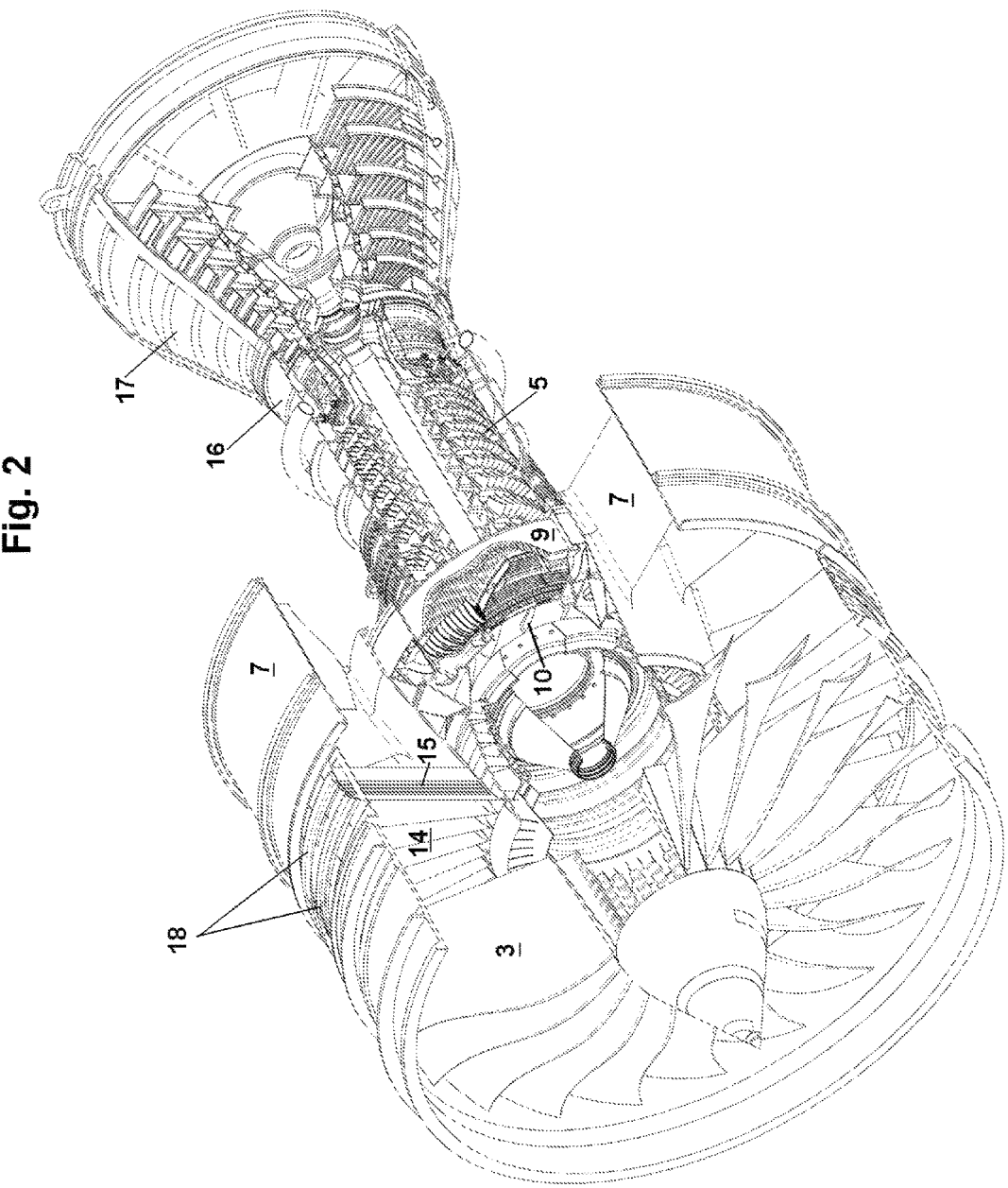
FIG. 2 is an isometric view of a hybrid electric get engine with partial cuts

Referring now to FIG. 2, the combustion section 16 and the turbines assembly 17 are shown. From a functional point of view, all the components on the back of the mid-box 7, as HP compressor 5, combustion section 16 and turbines assembly 17 may remain unchanged in relation with a non-hybrid engine. However, in order to obtain maximum operational efficiency, flow parameters have to be tuned differently. Additionally, in FIG. 2 are shown the distribution manifolds 18 used to deliver and to collect the coolant for each booster blade.

Figure 3:
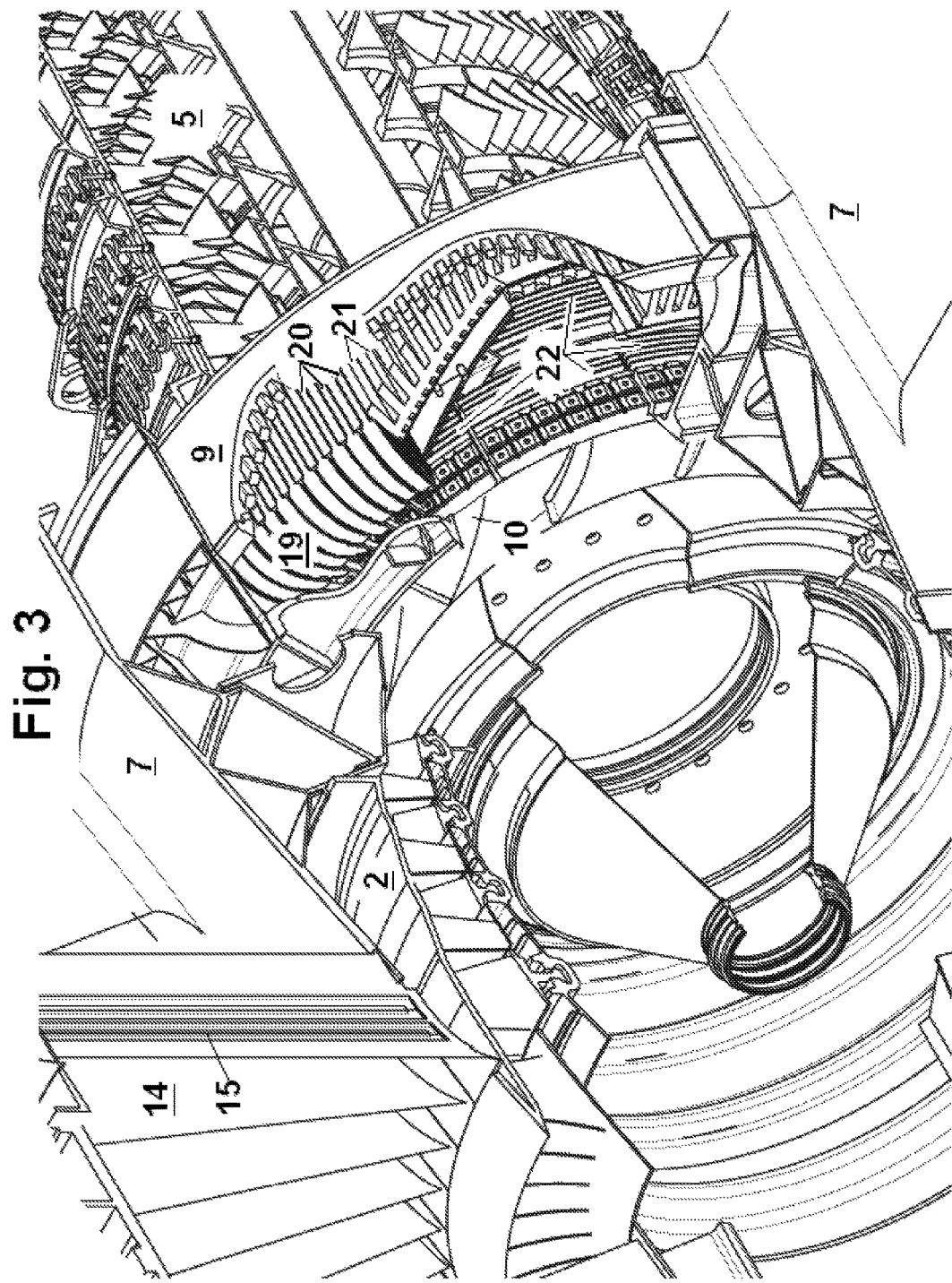
FIG. 3 shows a detailed view of the electric machine assembly with partial cuts
Figure 4:
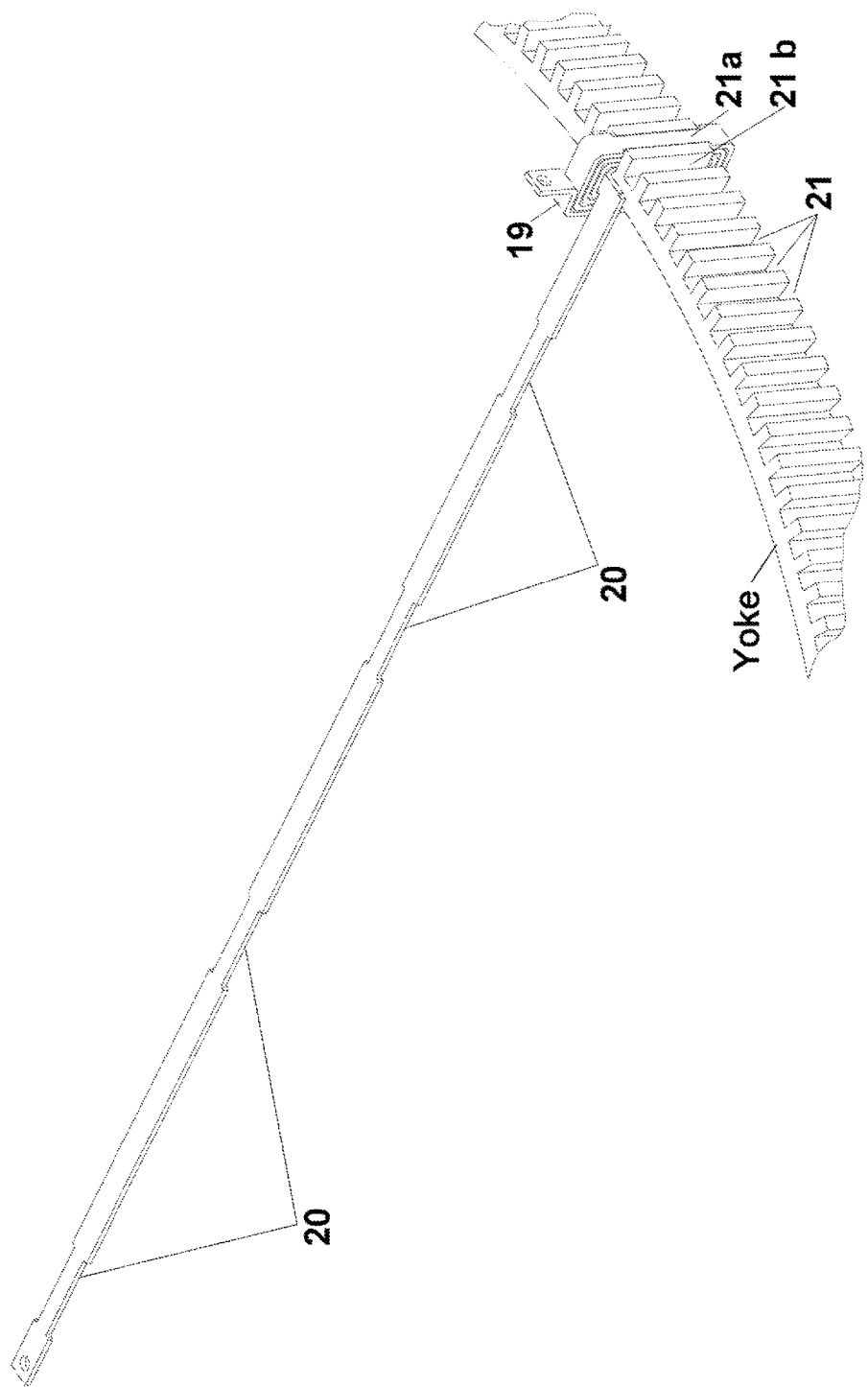
FIG. 4 shows a detailed CAD model of a coil partial unformed.

Referring to FIG. 3 the electric machine assembly is shown after a partial cut in the rotor 9. The stator coils 19 are designed with a sensible narrower section 20 to fit inside the stator slots 21. Outside of the slots, the coils have a larger section in order to decrease electrical and thermal resistivity and to enhance heat transfer. Each coil is connected directly to a power electronic module 22 located immediately beneath the coils. Each power module contain separate inverters for each coil 19. As presented, in each module there are 6 full H bridges (6×4 equivalent transistors), although the number of bridges per module and/or their configuration may vary according many technological and design related issues. The coils 19 and the modules 22 are cooled by the same cooling liquid. When the coolant exits the motor assembly it is pumped in the manifolds 18, cooled by the booster 14 and returns back in the motor assembly. Additionally, in FIG. 3 are shown (partial) the rotor curved spokes Referring to FIG. 4, the coil depicted is only formed in the first slot (with 4 turns) and unformed for the remaining 4 turns (which should fit in the adjacent slot). As shown, in order to form the coil, the winding process commences in the middle of two slots 21a and 21b. Technologically the conductor is no longer of a wire but moreover is a ribbon with some material removed for the portions of the coil located in the slot 20 (it can be water or laser cut from a sheet). As visually presented, the last turns have a higher length outside of the slot—obviously the increased cross section has subsequently a major impact in increasing the overall efficiency. In this specific design, the total stator resistance can be decreased at least 40% over conventional coils.

Figure 5:
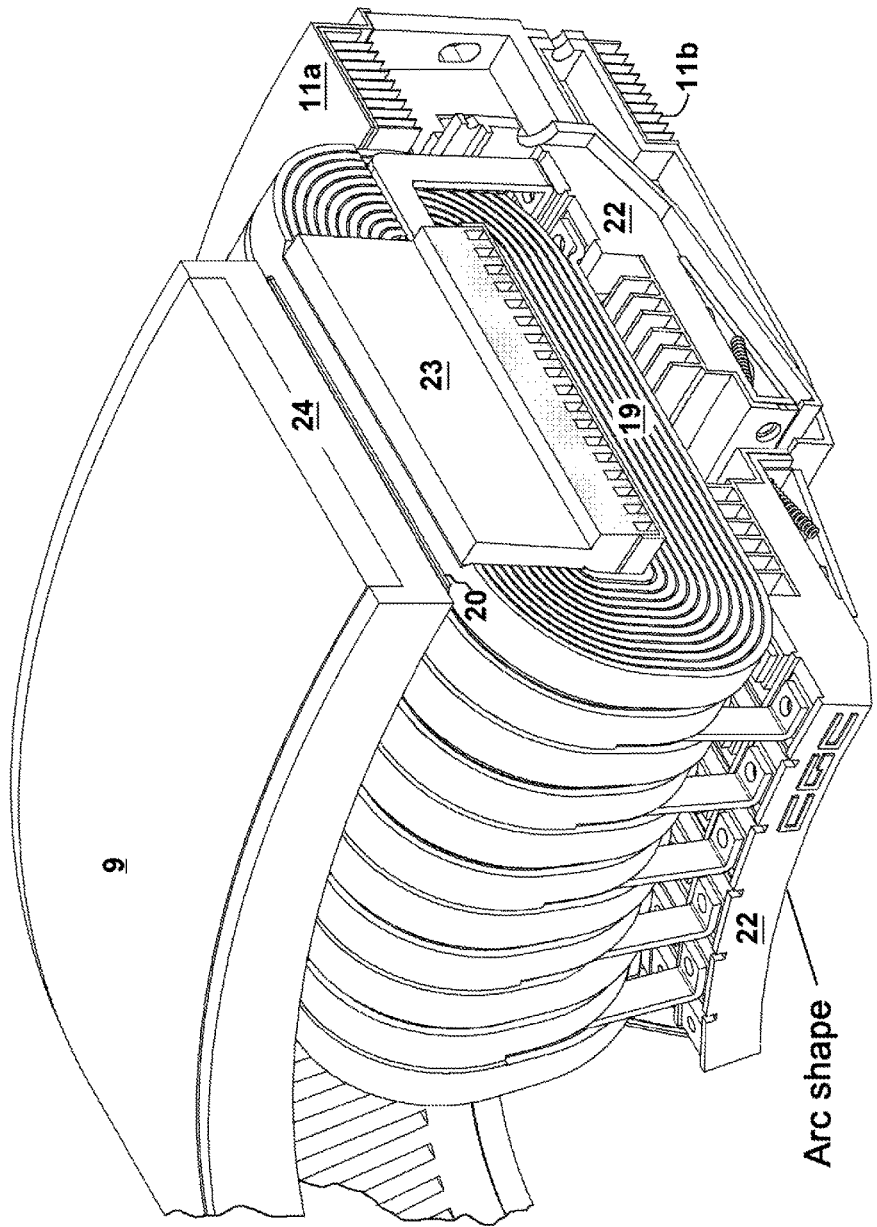
FIG. 5 shows a transversal section of the motor

Finally, in FIG. 5 a complete section of the motor shows a full coil 21 assembled around the stator magnetic circuit 23. External to the stator is located the electromagnetic circuit 24 of the rotor 9. The air gap between the stator and the rotor is sealed by two labyrinth seals 11a and 11b in order to help create a certain degree of vacuum while the motor is functioning.

The invention claimed is:

1. A hybrid electric jet engine containing;
   a jet engine coupled with at least one electric machine, the electric machine is connected with power-electronics, characterized by;
   said electric machine and power-electronics being coaxially located with a core of the jet engine inside a mid-box structure,
   the electric machine and power-electronics are further located between a by-pass duct and the outer geometry of the core,
   with said electric machine driving directly a LP shaft.

2. A hybrid electric jet engine according to claim 1, characterized by said electric machine is internally sealed and may be vacuumed or partially vacuumed on demand.

3. A hybrid electric jet engine according to claim 2, wherein the said vacuuming of the electric machine is obtained by bleeding compressed air from the exiting compressors into an adequate vacuum pump, of preference of a Venturi type.

4. A hybrid electric jet engine according to claim 1, characterized by said mid-box also being designed as a structural part of said electric machine.

5. A hybrid electric jet engine according to claim 1, characterized by said mid-box also being designed as a mechanic containment in case of catastrophic failure of said electric machine.

6. A hybrid electric jet engine according to claim 1, characterized by said mid-box being designed also as a magnetic and electric shield for said electric machine and its related power-electronics.

7. A hybrid electric jet engine according to claim 1, wherein said electric machine has a hollow shaft located between the LP and the HP compressors.

8. A hybrid electric jet engine according to claim 7, characterized by said electric machine shaft which has profiled (curved) spokes in order to allow an unrestricted airflow passage from the LP compressor to the HP compressor used so as to act as a compressor stage.

9. An electric machine and its associated power-electronics comprising, coils with variable geometry and,
   said associated power-electronics has a donut shape coaxial with the electric machine and the donut shaped power-electronics fit between the inner geometry of a jet engine by-pass duct and the outer geometry of the jet engine core,
   said associated power-electronics comprises a plurality of power modules characterized by each module consisting of one or more inverters.

10. An electric machine and its associated power-electronics according claim 9, characterized by said variable geometry coils having an enlarged cross section outside of the slot.

11. An electric machine and its associated power-electronics according claim 9, characterized by said variable geometry coils may be preferably formed in two adjacent slots by starting the coiling process in the middle of the slots.

12. An electric machine and its associated power-electronic according claim 9, wherein said associated power-electronic has a donut shape coaxially with the electric machine and being located in the very close vicinity of the electric machine characterized by said associated power-electronic embracing the jet engine core.

13. An electric machine and its associated power-electronic according claim 12, wherein said associated power-electronic comprises a plurality of power modules characterized by each module consisting of one or more inverters designed with a consistent arc/segment shape such that once fully assembled, the cylindrical/donut shape of power-electronic will fit between the inner geometry of the by-pass duct and the outer geometry of the core.

14. An electric machine and its associated power-electronic according claim 9, characterized by said variable geometry coils having ends that are formed in order to connect directly, of preferable bolted, to the associate power-electronic without intermediary feeders.

15. An electric machine and its associated power-electronic according claim 9, wherein said variable geometry coils are connected individually to a different inverter, characterized by independent control of each coil.

16. A hybrid electric jet engine containing;
   at least one electric machine and its associated power-electronics characterized by the dissipation of thermal losses related to said electric machine and recoverable losses in the by-pass duct wherein,
   a fan booster boosted by circulating coolant and a surface cooler that are able to dissipate the heat losses related to said electric machine and its associated power-electronics without introducing supplementary air-flow and pressure losses in the by-pass duct.

17. A hybrid electric jet engine, according claim 16, characterized by a fan booster circulated by coolant that is able to dissipate the heat losses related to said electric machine and its associated power-electronic without introducing supplementary air-flow (pressure) losses in the by-pass duct.

18. A hybrid electric jet engine, according claim 16, characterized by using a surface cooler located inside the by-pass duct in order to dissipate heat losses related to said electric machine and its associated power-electronic without introducing supplementary air-flow (pressure) losses in the by-pass duct.

* * * * *